(12) United States Patent
Stephenson et al.

(10) Patent No.: US 10,284,545 B2
(45) Date of Patent: May 7, 2019

(54) SECURE NETWORK ACCESS USING CREDENTIALS

(71) Applicant: ARRIS Enterprises LLC, Suwanee, GA (US)

(72) Inventors: David S. Stephenson, San Jose, CA (US); Doron Givoni, Sunnyvale, CA (US); Elad Cohen, Ramat-Gan (IL)

(73) Assignee: ARRIS Enterprises LLC, Suwanee, GA (US)

( * ) Notice: Subject to any disclaimer, the term of this patent is extended or adjusted under 35 U.S.C. 154(b) by 169 days.

(21) Appl. No.: 15/089,247

(22) Filed: Apr. 1, 2016

(65) Prior Publication Data

US 2016/0219038 A1    Jul. 28, 2016

Related U.S. Application Data

(63) Continuation of application No. PCT/US2014/058409, filed on Sep. 30, 2014.
(Continued)

(51) Int. Cl.
*H04W 4/02* (2018.01)
*H04L 29/06* (2006.01)
(Continued)

(52) U.S. Cl.
CPC ........ *H04L 63/083* (2013.01); *H04L 63/0807* (2013.01); *H04L 63/0823* (2013.01);
(Continued)

(58) Field of Classification Search
CPC ............... H04L 63/083; H04L 63/0807; H04L 63/0823; H04L 63/0884; H04L 63/102; H04W 12/06
See application file for complete search history.

(56) References Cited

U.S. PATENT DOCUMENTS 8,495,714 B2    7/2013   Jones et al.
9,526,022 B2 *  12/2016  Gupta ..................... H04W 4/70
(Continued)

FOREIGN PATENT DOCUMENTS

KR    101 243 713 B1     3/2013
WO       2012/142370 A2   10/2012
WO    WO 2012/0116886 A1  10/2012

OTHER PUBLICATIONS

PCT International Search Report of PCT/US14/58409; dated Mar. 3, 2015; (4 pgs.).
(Continued)

*Primary Examiner* — Saleh Najjar
*Assistant Examiner* — Louis C Teng
(74) *Attorney, Agent, or Firm* — Stewart M. Wiener

(57) ABSTRACT

Example embodiments include systems and methods for establishing secure wireless communications, including receive from a mobile user equipment (UE), via the access point (AP), a request to access the network, send, to the UE, a web page sign-in option of a third-party credential, receive an indication to use the third-party credential, redirect the UE to a corresponding third-party website login page and include an identifier, receive an authorization from the UE via the AP, the authorization having been sent to the UE from the third-party website after providing valid third-party credential to the third-party website, generate a proxy-credential, bind the authorization to the proxy-credential in the database, send the proxy-credential to the mobile user equipment via the access point, and authorize, via the access control server and the AP, the UE to establish a secure connection.

27 Claims, 5 Drawing Sheets

Related U.S. Application Data

(60) Provisional application No. 61/885,445, filed on Oct. 1, 2013.

(51) Int. Cl.
 *H04W 12/06* (2009.01)
 *H04W 84/12* (2009.01)

(52) U.S. Cl.
 CPC ........ *H04L 63/0884* (2013.01); *H04L 63/102* (2013.01); *H04W 12/06* (2013.01); *H04W 4/02* (2013.01); *H04W 84/12* (2013.01)

(56) References Cited

U.S. PATENT DOCUMENTS

| | | | | |
|---|---|---|---|---|
| 9,774,595 | B2* | 9/2017 | Omnes | H04L 63/0853 |
| 9,794,266 | B2* | 10/2017 | Faccin | H04L 63/102 |
| 2007/0113269 | A1 | 5/2007 | Zhang | |
| 2008/0271129 | A1 | 10/2008 | Mukkara | |
| 2012/0006886 | A1 | 1/2012 | Sato et al. | |
| 2012/0116886 | A1* | 5/2012 | Manku | G06Q 30/0267 |
| | | | | 705/14.64 |
| 2012/0192258 | A1* | 7/2012 | Spencer | H04W 12/06 |
| | | | | 726/7 |
| 2012/0210011 | A1 | 8/2012 | Liu et al. | |
| 2013/0024921 | A1* | 1/2013 | Gupta | H04L 63/0823 |
| | | | | 726/6 |
| 2013/0139241 | A1 | 5/2013 | Leeder | |
| 2013/0198383 | A1 | 8/2013 | Tseng et al. | |
| 2013/0212656 | A1* | 8/2013 | Ranade | H04L 63/062 |
| | | | | 726/6 |
| 2014/0130139 | A1 | 5/2014 | Lee | |
| 2014/0245411 | A1* | 8/2014 | Meng | H04L 63/08 |
| | | | | 726/7 |
| 2015/0172283 | A1* | 6/2015 | Omnes | H04L 63/0853 |
| | | | | 726/9 |
| 2016/0072823 | A1* | 3/2016 | Faccin | H04L 63/102 |
| | | | | 726/1 |

OTHER PUBLICATIONS

PCT Written Opinion of the International Searching Authority of PCT/US14/58409; dated Mar. 3, 2015; (7 pgs.).

PCT International Preliminary Report on Patentability of PCT/US14/58409; dated Apr. 5, 2016; (1 pg.).

Extended European search report of EP 14850219.8; dated Mar. 8, 2017; (9 pgs.).

Official Action, RE: Chinese Application No. 201480064804.6, dated Aug. 27, 2018.

Examination Report, RE: European Application No. 14850219.8, dated Sep. 17, 2018.

Official Action and Search Report, RE: Taiwan Application No. 103133967, dated Nov. 9, 2018.

* cited by examiner

SECURE NETWORK ACCESS USING CREDENTIALS

CROSS REFERENCE TO RELATED APPLICATIONS

This application claims priority from and is a continuation of international PCT patent application PCT/US14/58409 filed 30 Sep. 2014, which claims priority to U.S. provisional patent application Ser. No. 61/885,445 filed 1 Oct. 2013, which is incorporated herein by reference in its entirety.

TECHNICAL FIELD

This application relates to the field of secure wireless communications.

BACKGROUND

Current wireless systems and methods do not allow for secure wireless connections to be established using credentials from third party sources.

SUMMARY

The present invention provides a method, system and apparatus for providing an encrypted wireless connection using third-party credentials.

Certain example embodiments here include systems and methods for establishing secure wireless communications, including a system for establishing secure wireless communications, comprising, a credential-provisioning server in communication with an access point, a database, an access control server, and a network, the credential-provisioning server configured to, receive from a mobile user equipment, via the access point, a request to access the network, send, to the mobile user equipment, via the access point, a web page sign-in option of a third-party credential, receive, from the mobile user equipment, via the access point, an indication to use the third-party credential, redirect the mobile user equipment to a corresponding third-party website login page via the network, and include an identifier, receive an authorization from the mobile user equipment via the access point, the authorization having been sent to the mobile user equipment from the third-party website after providing valid third-party credential to the third-party website, generate a proxy-credential, bind the authorization to the proxy-credential in the database, send the proxy-credential to the mobile user equipment via the access point, and authorize, via the access control server and the access point, the mobile user equipment to establish a secure connection.

In certain example embodiments the credential-provisioning server is further configured to, request, via the network, permission to access user information from the third-party site, and permission to update the third-party site with a location information of the mobile user equipment.

In some embodiments the credential-provisioning server is further configured to, request, via the network, the user information from the third-party site after receiving the authorization from the mobile user equipment, and receive and save the user information from the third-party website in response to the request.

Further in some embodiments, the credential-provisioning server is further configured to, send the location information of the mobile user equipment to the third-party website via the network. And in some embodiments, the access control server is configured to, subsequent to the mobile user equipment previously accessing the network, receive the proxy-credential from the mobile user equipment via the access point, the proxy-credential having previously been sent to the mobile user equipment after successfully logging into the third-party website, validate the proxy-credential from the mobile user equipment via the access point, bind the access token with the received proxy-credential, send, via the network, the access token to the third-party website for validation, receive, via the network, an updated access token from the social network website if the access token is valid, and authorize the mobile user equipment to establish a secure connection via the access point.

In certain embodiments, the proxy-credential is a user-name and password credential, a client-certificate credential, and/or a dynamic pre-shared key. In some embodiments, the third-party credential is a social network credential and the third-party website is a social network website. In some embodiments, the identifier is an App-ID. And in some, the authorization is an authentication code.

In some embodiments, the credential-provisioning server is further configured to, exchange the authorization from the mobile user device for an access token from the third-party website via the network, and send the access control server the access token to bind, in the database, to the proxy credential that corresponds to the mobile user equipment.

And in some embodiments, OAuthv2 (RFC-6749) protocol can be used to receive an authorization, and exchange the authorization for an access token.

Example embodiments also include systems and methods for establishing secure wireless communications, including via an access control server in communication with a credential-provisioning server, an access point, a database, and a network, receiving a proxy-credential from a mobile user equipment via the access point, the proxy-credential having previously been sent to the mobile user equipment from the credential-provisioning server after successfully logging into a third-party website, validating the proxy-credential from the mobile user equipment via the access point, retrieving an access token bound to the received proxy-credential, sending, via the network, the access token to a third-party website for validation, receiving, via the network, an updated access token from the social network website if the access token is valid, and authorizing the mobile user equipment to establish a secure connection via the access point.

In some example embodiments, the proxy-credential was generated by the credential-provisioning server in response to the credential-provisioning server, receiving an authorization from the mobile user equipment via the access point, the authorization having been sent to the mobile user equipment from the third-party website after providing a valid third-party credential to the third-party website, and exchanging the authorization from the mobile user device for an access token from the third-party website via the network.

In some embodiments, the access control server, binds an access token with the received proxy-credential, sends, via the network, the access token to a third-party website for validation, and receives, via the network, an updated access token from the social network website if the access token is valid.

Other features and advantages of the invention will be apparent from the following detailed description, taken in conjunction with the accompanying drawings which illustrate, by way of example, various features of embodiments of the invention.

BRIEF DESCRIPTION OF THE DRAWINGS

For a better understanding of the embodiments described in this application, reference should be made to the Detailed Description below, in conjunction with the following drawings in which like reference numerals refer to corresponding parts throughout the figures.

DETAILED DESCRIPTION

Figure 1:
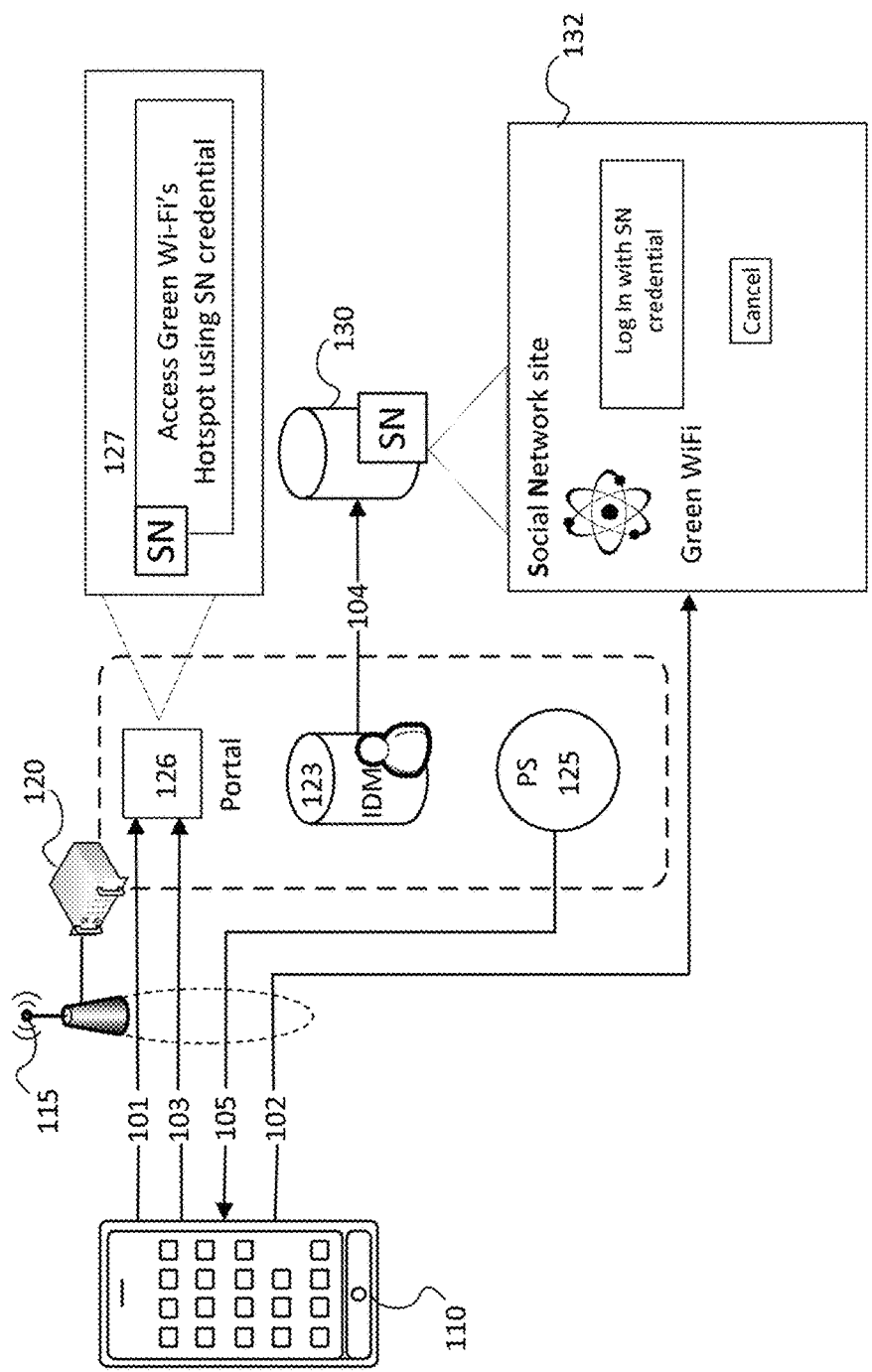
FIG. 1 is a block diagram showing an example architecture diagram consistent with the inventive aspects described here.

Reference will now be made in detail to embodiments, examples of which are illustrated in the accompanying drawings. In the following detailed description, numerous specific details are set forth in order to provide a sufficient understanding of the subject matter presented herein. But it will be apparent to one of ordinary skill in the art that the subject matter may be practiced without these specific details. Moreover, the particular embodiments described herein are provided by way of example and should not be used to limit the scope of the invention to these particular embodiments. In other instances, well-known data structures, timing protocols, software operations, procedures, and components have not been described in detail so as not to unnecessarily obscure aspects of the embodiments of the invention.

Overview

Certain embodiments disclosed here provide systems and methods for a mobile device or user equipment (UE) to establish a secure airlink connection to an 802.11 Access Point (AP) using some sort of credential. In certain embodiments, such a credential may be a previously established user third-party website credential. An example of a third-party website credential may be a social media or social network (SN) credential.

UEs are popular today and used to access networks such as the internet, both over wire and wirelessly. Wireless connections are subject to snooping, eavesdropping and malicious attacks if not encrypted. And although secure end-to-end tunneling may be established in certain circumstances (e.g., online banking using HTTPS, which is based on SSL/TLS), such tunneling still leaves the airlink between the UE and the AP in the clear, without encryption protection. Thus, traffic not using secure end-to-end tunneling is subject to snooping. Using established agreements between a wireless service provider and the operator of a website providing credentials, it is possible to allow consumers to utilize pre-existing website credentials to allow their UE to log into and establish an encrypted airlink with an AP.

It should be noted that UEs discussed here could be any number of devices configured to communicate wirelessly, for example but not limited to smartphones, laptops, netbooks, ultrabooks, tablets, phablets, handheld computers, etc. These may connect to the internet through a wireless connection using some network AP.

Further, it should be noted that certain standards such as IEEE 802.11 may be used for radio communication between UEs and APs. These APs that provide internet access may have "hotspot" functionality including a standards advancement to a hotspot and Wi-Fi connection known as Hotspot 2.0 (HS2.0). Hotspot 2.0 technology was developed by the Wi-Fi Alliance and allows UEs automatic and secure connection to a hotspot. Although not limited to HS2.0, the examples disclosed here use HS2.0 examples in order to put the disclosure into context. Thus, although not limited to HS2.0, embodiments disclosed here may be utilized using HS2.0 technology.

Security Examples

UEs are used today for accessing networks such as the internet, in some cases via a wireless connection. When a wireless connection uses Wi-Fi technology, the UE security and user security is enhanced when WPA2-Enterprise security is employed. WPA2-Enterprise security comprises three technologies: 802.1X (Port-based Network Access Control), 802.11i (802.11 airlink encryption) and EAP authentication; when WPA2-Enterprise security is successfully applied, the airlink between a UE and an AP is encrypted. This encryption provides confidentiality protection, integrity protection, replay protection and protection from so-called "man-in-the-middle" attacks.

Part of WPA2-Enterprise security is mutual authentication where a UE authenticates the identity of an access control server such as an Authentication, Authorization, and Accounting (AAA) server, thereby insuring it is connected to the intended Wi-Fi network and the network authenticates the UE's identity. Such an access control server handles requests for access to network resources and can provide services such as authentication, authorization and accounting via for example, the RADIUS protocol. Mutual authentication may be carried out using one of the EAP (Extensible Authentication Protocol, see RFC-3748) methods standardized by the Internet Engineering Task Force (IETF), for example, EAP-Tunneled Transport Layer Security (EAP-TTLS) (see RFC-5281). At the conclusion of a successful EAP exchange, the AAA server delivers to the AP a master session key (MSK) and the UE locally computes its own MSK that, when successful, has the same value as the MSK delivered to the AP. The MSKs are then used in conjunction with 802.11i encryption protocols to generate a pairwise transient key (PTK), used to encrypt unicast transmissions between the UE and AP, and to securely transmit a group transient key (GTK), used to encrypt broadcast and multicast transmissions from the AP to the UE.

Independent of Wi-Fi technology, the IETF has developed other protocols which employ authentication and are commonly used in the world wide web. Two examples are Hyper Text Transport Protocol Secure (HTTPS) which is HTTP over transport layer security (TLS); see RFC-2616 for HTTP and RFC-5246 for TLS and HTTP Digest (see RFC-2617). In HTTPS, the TLS layer may be configured as anonymous for the client, meaning that the client authenticates the server using the server's X.509 certificate but the server does not authenticate the client. Client authentication may be performed after the TLS tunnel has been successfully established by having the client provide a uniform resource locator (URL)-encoded username/password to the server, transported over HTTP, inside the encrypted TLS tunnel. Both HTTPS and HTTP Digest support mutual authentication. But, neither of these technologies provides, or generates, an MSK which can be used in conjunction with 802.11i to secure a Wi-Fi airlink.

Many websites have a large user base whose users have already been issued username/password credentials, and could benefit by leveraging those credentials for other purposes, such as for wireless network access.

Examples of websites which have issued username/password credentials to a large number of users includes, but is not limited to SN sites such as Facebook, Google, Google+, MySpace, LinkedIn, TripIt, Twitter, Yammer and Yahoo! to name a few. Users of SN sites might want to use their credentials for Wi-Fi network access and/or update their SN home page with their current location (i.e., a "check-in"). SN sites might want to support these uses of credentials as a means to extend their advertising to venue owners providing public Wi-Fi network access. There are other websites which have issued username/password credentials as well which might want to leverage them for Wi-Fi network access, such as retail and hospitality loyalty sites.

In certain embodiments, once user authentication has been successfully completed, the AAA server can post an update on the user's social media home page and/or retrieve information about the user. It should be noted that in certain embodiments, when the user authorized the providing public Wi-Fi venue owner to use their social network site credentials, they also authorize the social network site API to provide certain personal information, deemed by the user to be sharable. For example, the AAA server could update the venue name and location where the user's UE logs in, such as the particular coffee store at 123 Main Street. Also the AAA server could retrieve from the example SN site API the user's list of friends, their favorite food and other personal information. In turn the AAA server could pass this information to a location-based services engine which may provide some sort of customer enhancement that the venue promotes. This information can be valuable for a wireless services provider as it may allow that hotspot operator to provide some degree of personalized services to the user. For example, the venue could offer to the user a discount coupon for their favorite beverage, or perhaps could offer a free beverage the next time they bring on of their friends on the list, etc.

And there are various reasons why a user may wish to use a pre-existing SN account credential to log into a network. That user may want their social network friends to know where they are. They may find useful that their SN credentials gain them Wi-Fi access at potentially many venues to access the internet. Further, by tying the SN account into the wireless service provider login, there may be promotions for which that user is eligible, as explained above.

Many SN websites support an authentication technology called OAuth 2.0 (see IETF RFC-6749). The embodiments described herein include systems and methods which can leverage OAuth2 authorization protocols and Hotspot 2.0 Release 2 online signup (in-venue, on-the-spot credential provisioning) to provide wireless network access in a manner which generates an MSK enabling WPA2-Enterprise use in public wireless access networks. Thus these systems and methods provide on-boarding to Wi-Fi hotspots, allowing consumers to or "bring your own device" (BYOD) to the network.

Example Flow

In an example situation, a user (consumer) walks into a hotspot location equipped with APs used to provide wireless internet access for its customers. In certain embodiments, the example APs are configured to use WPA2-Enterprise security. The user, wishing to connect to the internet, is required to sign into a wireless service provider account, which must be established with the individual wireless service provider company operating those wireless APs. In this example, initially, the UE's connection manager does not possess credentials that could be used to authenticate with the hotspot. What is required is for each user to establish a login credential (e.g., username and password) with the individual wireless service providers they choose to use. The login credential may be used while logging into any AP operated by that particular wireless service provider.

However, the user may have a username/password credential for an example SN site. Further the SN site, in this example, supports OAuthv2. And, the APs in the local hotspot are configured to use Hotspot 2.0 Release 2, which includes an online sign-up capability. The embodiments here describe the systems and methods for a server to use OAuthv2 in conjunction with Hotspot 2.0 online sign-up protocols in a manner that uses pre-existing SN credential for user authentication, followed by the generation of an MSK thereby facilitating airlink encryption according to the WPA2-Enterprise protocol. It should be noted that OAuthv2 does not generate an MSK. The server mentioned above is a server, (or group of servers or functionality distributed among a plurality of servers) that implement hotspot functionality.

In certain embodiments, the user establishes their identity by signing into a SN website and authorizing the wireless service provider to use their SN identity. Once so authorized, an online signup (OSU) server creates a "proxy-credential", which it then binds to the user's SN identity. Use of the term OSU server is not intended to be limiting. Any number of servers could be used here including but not limited to a credential-provisioning server. It is sufficient that the OSU server provide credential-provisioning functionality as described herein.

It should also be noted that one of ordinary skill in the art would recognize that the concepts described herein could equally apply where another credential is used to create a proxy credential to facilitate encryption of an airlink.

Hotspot 2.0 online sign-up protocols are used to establish and provision to the mobile device a so-called "proxy-credential". The proxy-credential can be a username and password credential or an X.509 client-certificate credential. Although called a proxy-credential in this invention, it may be no different than any username/password or client-certificate credential used with WPA2-Enterprise. As such, subsequent to EAP authentication, the UE and AP generate or obtain respectively an MSK, which in turn is used to encrypt communications on the airlink. After the hotspot's OSU server provisions the proxy-credential to the UE, it also provisions the proxy-credential to the wireless service provider's (hotspot operator's) AAA server for future use. Thereafter, the UE can use the proxy-credential with Hotspot 2.0 protocols to automatically and securely log into hotspots operated by the wireless service provider.

Therefore, when the consumer comes back to the hotspot (at the initial location or another location), the UE can automatically and autonomously use the proxy-credential according to Hotspot 2.0 protocols to login to the hotspot. When the hotspot's AAA server receives the UE's authentication request, it checks with the SN website to confirm the user's authorization to use his/her SN credential is still in effect, and if so, authenticates the UE and authorizes it for Wi-Fi access.

Overview Sign in Examples

Now turning in detail to FIG. 1 which depicts an example embodiment of how a user via a UE 110 may sign into a wireless service provider with existing credentials, and thereby establish a secure airlink. In this example, the hotspot has two WLANs operating concurrently—a secure WPA2-Enterprise WLAN and an open WLAN used for online signup. Furthermore, the hotspot operator has previously made arrangements with an SN website to provide Wi-Fi access using the SN's users' credentials. When this arrangement was made, the hotspot operator obtained from the SN website a "App-ID", which can identify that hotspot operator. In some embodiments the App-ID can uniquely identify the hotspot operator. As will be described, the App-ID can be used in certain message exchanges between the hotspot's OSU server and SN website. It should be noted that the use of the term App-ID is not intended to be limiting, as it could be any number of identifiers in various embodiments.

First, the UE 110 comes in range of an access point (AP) 115 and using Hotspot 2.0 protocols, determines it doesn't possess the proper security credentials to join the hotspot. So instead the UE associates to the open SSID used for online sign-up. In step 101, the UE receives an OSU webpage 127 via portal 126, and presents it to the user via the UE 110. The OSU webpage may present various choices for the user to log into and use the wireless service provider service, one of which may be via that user's pre-existing SN credential 127, such as their username and password.

Next in the example, in step 102, if the user clicks on the choice to use their pre-existing SN credential, the UE browser is redirected by the portal to the appropriate SN website. Before the UE browser is redirected to the SN site, the portal 126 adds the App-ID or identifier of the wireless service provider to the redirection URL which causes the SN site to display to the user the wireless service provider, or other custom information, in this example "Green Wi-Fi's" (an exemplary service provider) request to access to the user's SN webpage and/or information. The user is offered the ability to log into the SN site using their previously established SN username and password.

If the user provides appropriate credentials, the SN site sends an Authentication Code to the UE. It should be noted that the use of the term Authentication Code is not intended to be limiting. Any of various authorizations could be used; it is sufficient that the Authorization Code indicate authorization from the SN site. The user may also give authorization to permit the wireless service provider, in this example "Green Wi-Fi's" Identity Manager and AAA (together here as IDM) 123 to access certain user information from the particular SN site at various levels or perform certain activities. For example, certain levels may allow the system to access personal information from the user's SN account, such as demographic information, friend information, history of visited locations, etc. Certain examples may allow the system to access the user's account and write a "check-in" post to the user's SN page. Then, continuing with step 103 of the example embodiment, the UE 110 may then be redirected by the SN site 132 to portal 126 with an Authentication Code or authorization provided by the SN site.

Then in certain example embodiments, in step 104, the OSU server via the IDM 123, sends a request directly to the SN site server 130 to exchange the Authentication Code for an Access Token. Some SN websites limit the lifetime of the Authentication Code to a short time interval, for example two hours. Therefore, wireless service providers have up to two hours to exchange the Authentication Code for an Access Token. In some situations, the Access Token remains in effect for a longer period of time, for example sixty days. Once the Access Token expires, a new Authentication Code and Access Token need to be obtained by the wireless service provider in order to continue accessing that SN user's credential. The wireless service provider uses the Access Token as described below.

Once the OSU server 120 has the Access Token, it creates a binding to the proxy-credential and stores the binding, the Access Token and proxy-credential in its local user database, which is in communication with the IDM 123 in the example. Next, in step 105 the provisioning server (PS) 125 generates a proxy-credential to send to the UE 110 to provision it using the methods of Hotspot 2.0 release 2, in this example.

In example embodiments that do not use an Access Token, the OSU server or the proxy-credential server may bind the proxy-credential with the authorization in a database.

Once provisioned, the UE can switch to an encrypted Wireless Local Area Network (WLAN) of the AP. To switch (at the initial location or when the user later returns to the same location or another location where the proxy-credential can be used), the UE automatically and autonomously uses the proxy-credential according to Hotspot 2.0 protocols to login to the hotspot. When the hotspot's AAA server receives the UE's authentication request, it sends the Access Token to the SN website to confirm the user's authorization to use his/her SN credential is still in effect. If the Access Token is accepted by the SN website, the user's authorization is still in effect; if so, the AAA server authenticates the UE's proxy-credential and, if successful, authorizes the mobile device for Wi-Fi access. If the Access Token is not accepted by the SN website, the user's authorization has either expired or been revoked, therefore the AAA server rejects the UE's proxy-credential authentication request and does not authorize the mobile device for Wi-Fi access.

One skilled in the art will recognize that the proxy-credential could instead be a dynamic, pre-shared key. A dynamic, pre-shared key would be issued by a server when Wi-Fi security is configured to use WPA-Personal or WPA2-Personal (which employs a pre-shared key to establish cryptographic keys).

Figure 2A:
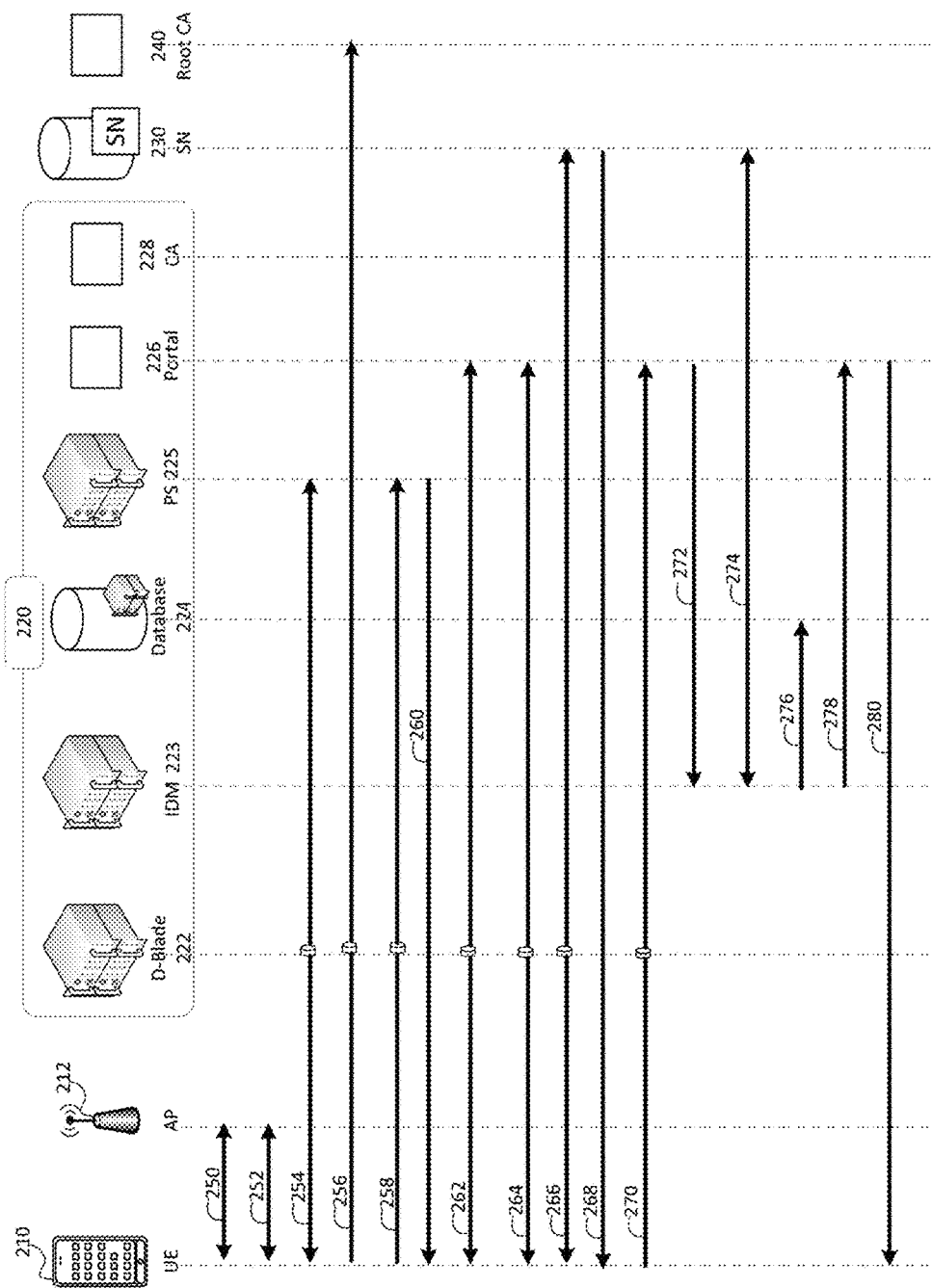
FIG. 2A is a messaging chart showing an example message flow consistent with the inventive aspects described here.
Figure 2B:
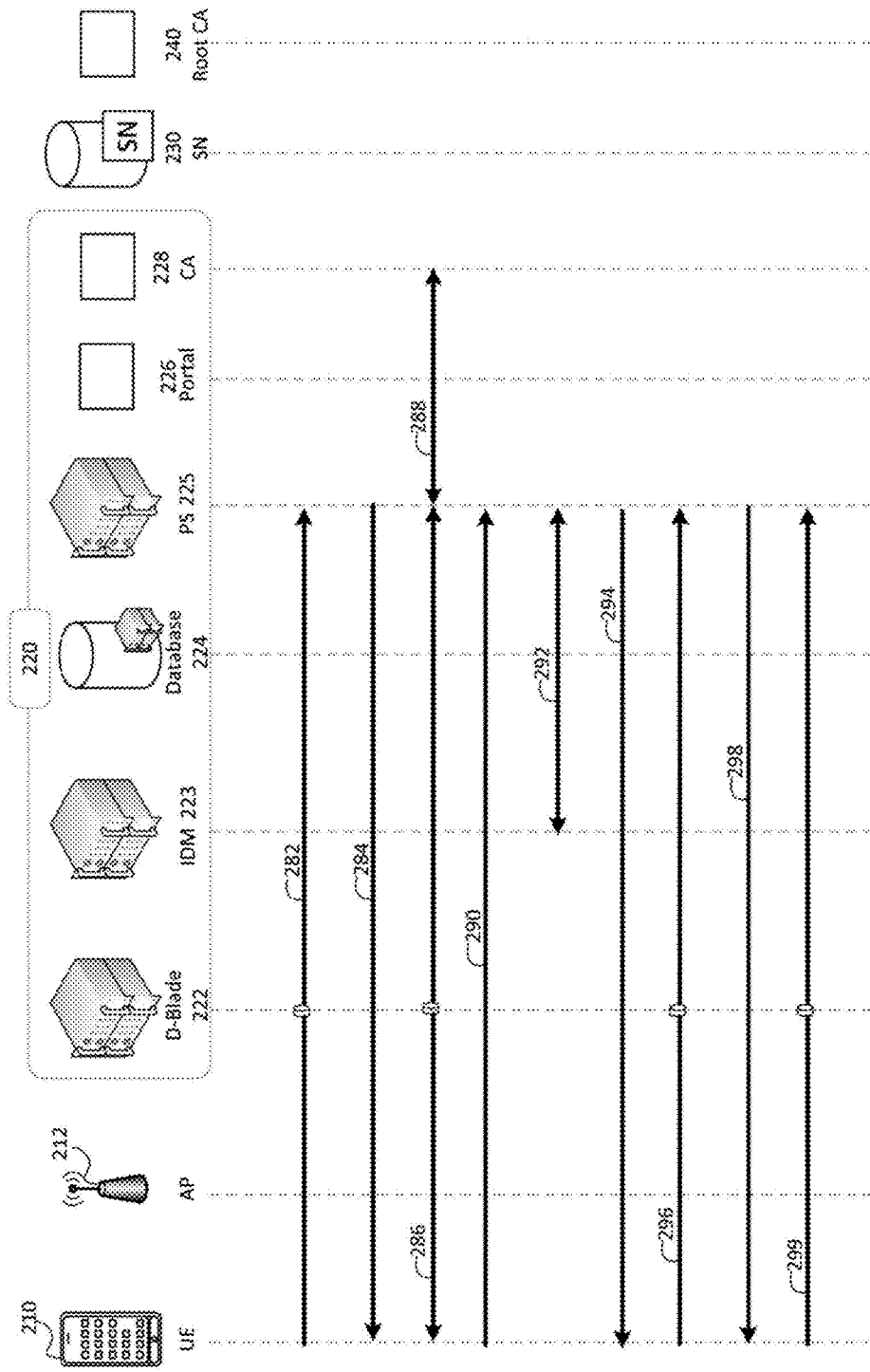
FIG. 2B is another messaging chart showing an example message flow consistent with the inventive aspects described here.

Detailed Example Message Sequences where UE has not been Previously Authenticated In order to help illustrate certain embodiments herein, detailed message sequence charts are provided in examples in FIGS. 2A and 2B.

FIG. 2A depicts an example message sequence, detailing the example sequences and steps used in the methods and systems disclosed here. FIG. 2B depicts example Hotspot 2.0 steps, after the SN credentials are used to log in, and the binding has taken place, as described above. Again a SN example is used, but should not be interpreted as limiting, merely illustrative.

FIG. 2A includes a UE 210, an AP 212, and certain networking aspects, shown for example, housed in an OSU 220. These include a dataplane module, called a D-Blade 222, which is a data forwarding engine that forwards packets through the OSU and integrated database management and AAA server (IDM), 223, a data base, here a distributed database 224 such as server running Cassandra, a provisioning server (PS), 225 which provisions a security credential to the UE using Hotspot 2.0 methods, and a portal 226 which acts as an interface for the user via the UE browser. The security credential can be a username/password or an X.509v3 client certificate. Also shown is a certificate CA 228 which may be used to create X.509v3 client certificates as needed. Also shown is the SN website 230.

It should be noted that in the above example, the D-Blade is used, as it serves as the access list (ACL) enforcer to allow only the OSU/SN relevant packets to be routed to the OSU modules and SN login site. Different example embodiments may deploy such capability on the AP instead of the D-Blade.

Note that the example steps in the following paragraphs are illustrative of steps in Hotspot 2.0 message sequences in conjunction with OAuth 2 (RFC-5746) messages where the SN site and the venue operator create a secure Wi-Fi session using WPA2-Enterprise.

Turning to the messaging exchange example in FIG. 2A, in which the UE 210 does not already have the credentials used to log in, to the wireless service provider hotspot, but does have a SN log in credential, the UE 210 messages the AP 212 at 250. At this step, the UE determines, using Hotspot 2.0 methods, that it cannot join the WPA2-Enterprise SSID at the hotspot because it doesn't have a valid security credential and therefore decides to sign up for Wi-Fi access.

Next, the UE 210 and AP 212 exchange messages 252 where the UE 210 associates to the signup SSID on AP 212.

Then, messages are exchanged 254, where the UE 210 establishes a transport layer security (TLS) connection with the PS 225 via the D-Blade 222. It should be noted that in certain embodiments, the D-Blade 222 is not needed here.

Next, a message is sent 256, from the UE 210 to verify with the Root CA 240 that the PS's server certificate, or the OSU server certificate, has not been revoked. This procedure uses online certificate status protocol (OCSP) to validate the OSU certificate via the D-Blade 222. It should be noted that in certain embodiments, the D-Blade 222 is not necessary here.

Next, a message is sent 258, a sppPostDevData request (simple object access protocol, SOAP-XML) by the UE 210 to the PS 225 via the D-Blade 222. It should be noted that in certain embodiments, the D-Blade 222 is not necessary here. The sppPostDevData request is a Hotspot 2.0 request method which initiates credential provisioning, such as for example, online signup.

Then, a SOAP-XML message is sent 260, from the PS 225 back to the UE 210, a command to launch a browser to a URL which is the URL of the portal 226.

The UE 210 then, exchanges messages 262, with the portal 226 for the portal signup page using HTTPS via the D-Blade 222. It should be noted that in certain embodiments, the D-Blade 222 is not necessary here (the D-Blade is used as the access control list (ACL) enforcer to allow only the OSU/SN relevant packets to be routed to the OSU modules and SN login site. If these access restrictions are not needed or performed by some other network component, the D-Blade is not used). Once the user's mobile device renders the portal signup page, the UE 210 user can "Access Green Wi-Fi's Hotspot using SN credential."

Messages are then exchanged 264 to redirect to the SN, 230, where the portal 226, adds an identifier or App-ID, redirect URI (back to Portal) via the D-Blade 222. It should be noted that a messages 264 may not need to be sent via the D-Blade 222 in certain embodiments.

The UE 210 then exchanges messages 266, with the SN website 230 to exchange SN login dialogue and confirm the PS client permissions (as described above) via the D-Blade 222. It should be noted that messages 266 may not need to be sent via the D-Blade 222 in certain embodiments.

Then the SN site 230 may message to redirect 268, the UE 210 with the Authentication Code or authorization.

The UE 210 then sends a confirmation message 270, to the portal 226 via the D-Blade 222, with the Authentication Code or authorization. It should be noted that a message 270 may not need to be sent via the D-Blade 222 in certain embodiments.

Portal 226 sends a registration request to the IDM 272.

The IDM exchanges messages 274 with the SN website, whereby as previously described, it exchanges the Authentication Code with the Access Token from the SN. The IDM saves the Access Token in the database 224. This allows the IDM to look up the Access Token at a future date when the user comes back and attempts to join the hotspot.

Access Token and the IDM 223 may send a response of a confirmation or failure notice 278 for the request to use the SN's user credential to the portal 226.

Finally 280, the portal 226 sends a final "HTTP redirect 302" to the UE 210. If the request to use the SN's user's credential for Wi-Fi access failed (notification provided in message 228), the portal 226 informs the UE 310 in this step. This completes the SN part of the authorization in this example.

Described next are the steps to provision a proxy-credential, specifically, an X.509v3 client certificate to the user's UE and then bind the SN credential with the proxy-credential (the new X.509v3 client certificate credential) the system is issuing.

Next, in this example, as shown in FIG. 2B, the Hotspot 2.0 exchanges are made to complete the online signup procedure. The UE 210 sends an SOAP-XML indication message 282 that the user has completed provisioning all the necessary information to the SN website to the PS 225. This may be the PS's signal to initiate certificate credential enrollment. Enrollment is the name used by Hotspot 2.0 for issuing a client certificate to a mobile device.

Next with message 284, the PS 225 sends a certificate enrollment request (SOAP-XML) message to the UE 210.

The UE 210 then exchanges HTTPS-based messages 286 via the D Blade 222, to the PS 225 to perform certificate enrollment (EST, see Enrollment over Secure Transport, IEFT RFC-7030). It should be noted that to exchange messages 289 in certain embodiments, the D-Blade 222 is not necessary here. Then the PS 225 exchanges messages 288 with CA 228 to generate a client certificate, which is provisioned to the UE.

After the UE 210 successfully installs the certificate, the UE signals a success indication 290 to the PS 225.

The PS 225 exchanges messages 292 to get a Hotspot 2.0 PerProviderSubscription Management Object (PPS MO) from the IDM 223. The PPS MO contains connection manager settings for the UE, identifying information for the service provider (e.g. Green Wi-Fi) and other metadata related to the credential.

The PS 225 then sends a message 294 to provision the UE 210 with PPS MO.

The UE 210, then sends a message 296 via the D-Blade 222 to the PS 225 that the PPS MO was installed successfully, (SOAP-XML). It should be noted that a message 296 may not need to be sent via the D-Blade 222 in certain embodiments.

The PS 225 sends a message 298, the UE 210 that the registration succeeded, (SOAP-XML).

And the UE 210, sends a message 299 via the D-Blade 222, the PS 225, to indicate release TLS (SOAP-XML). This then allows encrypted communication between the AP and UE because the UE is provisioned with the appropriate certificates and/or MSK. It should be noted that a message 299 may not need to be sent via the D-Blade 222 in certain embodiments.

Messaging Examples after Previously Authenticating

Figure 3:
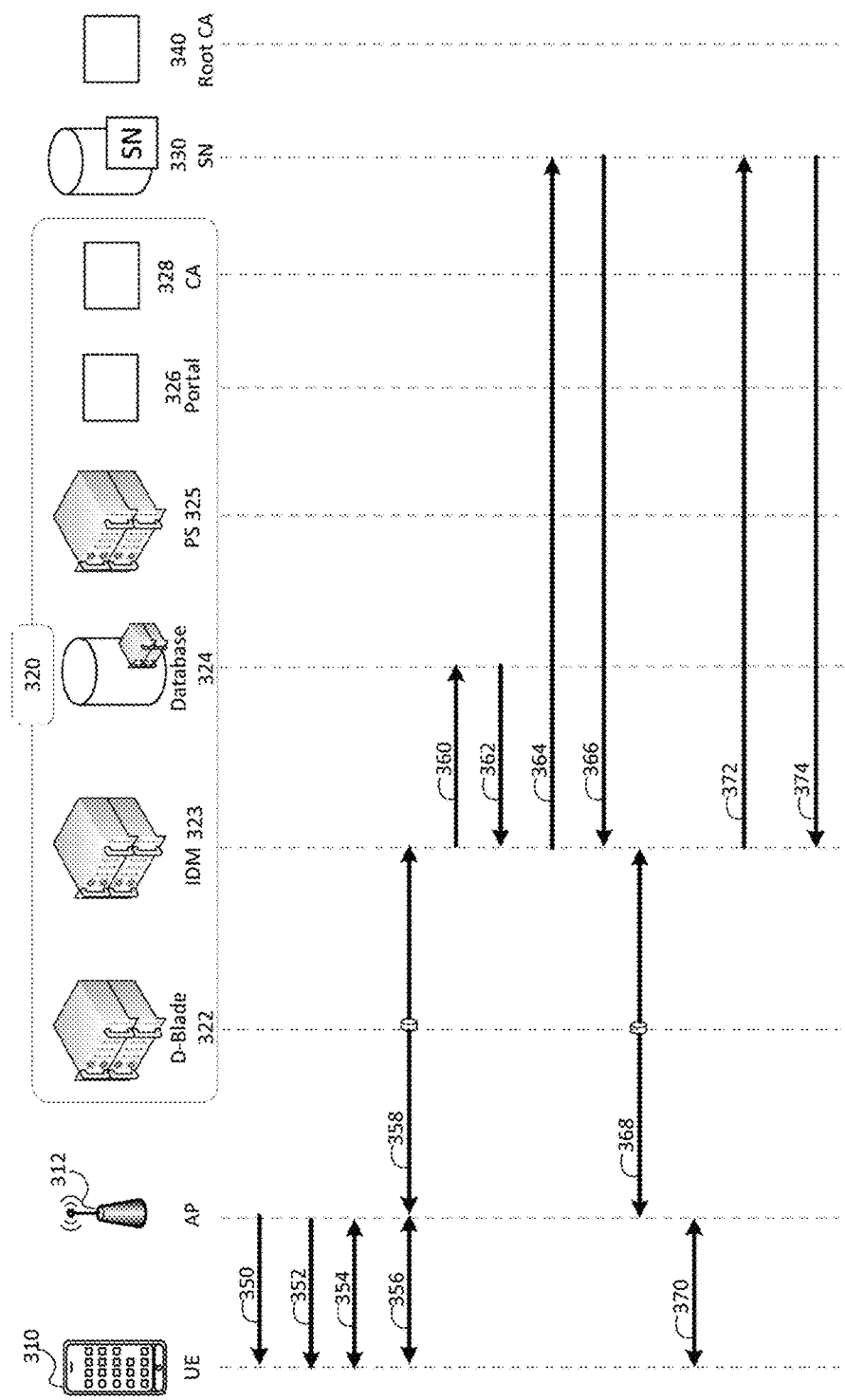
FIG. 3 is another messaging chart showing an example message flow after initial connection consistent with the inventive aspects described here.

The examples shown above in FIGS. 2A and 2B are when the UE has not previously connected using the SN credentials. FIG. 3 depicts an example where the user 310 has already visited the hotspot and has already been provisioned a client certificate, which was bound by the OSU server to their SN credential, by the generated Access Token.

In the example, FIG. 3, an example UE 310 comes into range with and wishes to associate with an AP 312, the AP sends a message 350 to the UE 310. The UE's connection manager may use 802.11u GAS/ANQP, or another generic advertisement service/access network query protocol, to determine whether it has a credential from any of the Wi-Fi network's roaming partners or the Wi-Fi hotspot operator itself.

Next, the AP sends a message 352, to the UE that it can authenticate credentials from the wireless service provider, for example via the realm "Green-Wi-Fi" from the previous examples.

Then, the UE 310 exchanges message 354 with the AP 312 to associate to the AP 312.

The UE 310 exchanges message 356 with the AP 312 which in turn exchanges messages 358 with the IDM 323 via the D-Blade server 322 to initiate an EAP-TLS authentication exchange with the wireless service provider's AAA server 323. In this step, the AAA server begins authenticating the UE's proxy-credential (which is an X.509v3 client certificate). Note that EAP-TLS is the method used when the UE possesses an X.509v3 client certificate. It should be noted that a message 358 may not need to be sent via the D-Blade 222 in certain embodiments.

Next, when the AAA server in the IDM 323 receives the client certificate, it sends a message to the database 324 which in turn sends a message 362 back regarding the example SN site Access Token for that user.

Then, the IDM 323 sends a message 364, with the Access Token to the example social network site 330 API. In return, the SN site sends a message 366, with an updated Access Token.

If the update succeeds, then the user has not revoked permission to use the example SN site credential and the EAP authentication should proceed.

Next, messages are exchanged 368 between the AAA server in the IDM 323 with the AP 312 via the D-Blade 322, regarding EAP success and Access-Accept (success) via RADIUS. It should be noted that a messages 368 may not need to be sent via the D-Blade 222 in certain embodiments.

Then the AP 312 and UE 310 exchange messages 370 regarding the 802.11 four-way handshake (4WHS), to establish a layer 2 security association (WPA2 Enterprise security). Note that if an Access Token update fails, then the user authentication should fail and the UE should be de-authenticated from the Wi-Fi network (in this case a RADIUS Access Reject message is sent to the AP).

This then allows encrypted communications between the AP and the UE.

Example Summary

Figure 4:
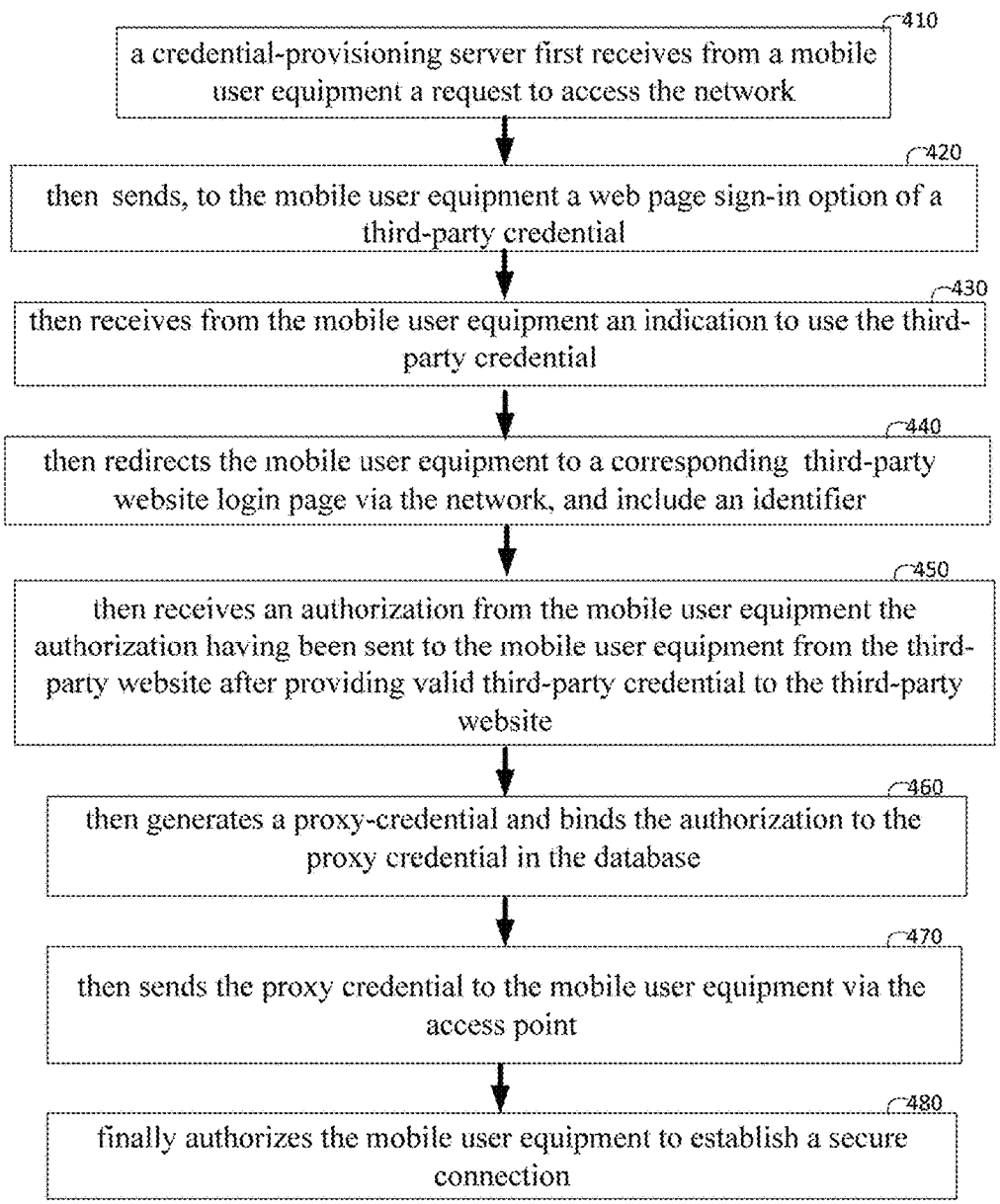
FIG. 4 is an example flow chart consistent with the inventive aspects described here.

FIG. 4 shows a flow chart with an example summary of certain embodiments described herein. First, 410 a credential-provisioning server first receives from a mobile user equipment a request to access the network. Then 420, the credential-provisioning server sends, to the mobile user equipment a web page sign-in option of a third-party credential. Then 430 the credential-provisioning server receives from the mobile user equipment an indication to use the third-party credential. Then 440 the credential-provisioning server redirects the mobile user equipment to a corresponding third-party website login page via the network, and include an identifier. Then 450 the credential-provisioning server receives an authentication code or authorization from the mobile user equipment the authentication code or authorization having been sent to the mobile user equipment from the third-party website after providing valid third-party credential to the third-party website. Then 460 the credential-provisioning server generates a proxy-credential and binds the authorization to the proxy credential in the database. Then 470 the credential-provisioning server sends the proxy credential to the mobile user equipment via the access point. Finally, 480 the credential-provisioning server authorizes the mobile user equipment to establish a secure connection.

Example Embodiments with a Single Housing

It should be noted that in the figures certain functionalities and components parts are shown grouped into one unit, the online signup server (OSU) 120. But this is only exemplary and illustrative. For example, in FIG. 1, the OSU 120 is shown including the portal 126, the IDM 123 or AAA server, the provisioning server (PS) 125. And in FIG. 2, an OSU 220 is shown including a D-Blade 222, an IDM 223, a database 224, a portal 226, and certificates 228. The database 224 may be any distributed database, such as a Cassandra database, in order to provide replication across OSU nodes, thereby facilitating massive scalability for carrier deployments. But any and all of these components need not be singularly housed into one component, the OSU 120, and 220, etc. Instead, the component parts may be grouped in any fashion. But in these example embodiments here, certain component parts are grouped into one product housing, the OSU 120, 220, 320.

CONCLUSION

It should be noted that the term "hotspot" is used in an exemplary manner only. The inventive aspects of the disclosure here could be used with many different kinds of wireless communications interfaces and standards. Wi-Fi standards are used in exemplary fashion throughout this disclosure.

As disclosed herein, features consistent with the present inventions may be implemented via computer-hardware, software and/or firmware. For example, the systems and methods disclosed herein may be embodied in various forms including, for example, a data processor, such as a computer that also includes a database, digital electronic circuitry, firmware, software, computer networks, servers, or in combinations of them. Further, while some of the disclosed implementations describe specific hardware components, systems and methods consistent with the innovations herein may be implemented with any combination of hardware, software and/or firmware. Moreover, the above-noted features and other aspects and principles of the innovations herein may be implemented in various environments. Such environments and related applications may be specially constructed for performing the various routines, processes and/or operations according to the invention or they may include a general-purpose computer or computing platform selectively activated or reconfigured by code to provide the necessary functionality. The processes disclosed herein are not inherently related to any particular computer, network, architecture, environment, or other apparatus, and may be implemented by a suitable combination of hardware, software, and/or firmware. For example, various general-purpose machines may be used with programs written in accordance with teachings of the invention, or it may be more convenient to construct a specialized apparatus or system to perform the required methods and techniques.

Aspects of the method and system described herein, such as the logic, may be implemented as functionality programmed into any of a variety of circuitry, including programmable logic devices ("PLDs"), such as field programmable gate arrays ("FPGAs"), programmable array logic ("PAL") devices, electrically programmable logic and memory devices and standard cell-based devices, as well as application specific integrated circuits. Some other possibilities for implementing aspects include: memory devices, microcontrollers with memory (such as EEPROM), embedded microprocessors, firmware, software, etc. Furthermore, aspects may be embodied in microprocessors having software-based circuit emulation, discrete logic (sequential and combinatorial), custom devices, fuzzy (neural) logic, quantum devices, and hybrids of any of the above device types. The underlying device technologies may be provided in a variety of component types, e.g., metal-oxide semiconductor field-effect transistor ("MOSFET") technologies like complementary metal-oxide semiconductor ("CMOS"), bipolar technologies like emitter-coupled logic ("ECL"), polymer technologies (e.g., silicon-conjugated polymer and metal-conjugated polymer-metal structures), mixed analog and digital, and so on.

It should also be noted that the various logic and/or functions disclosed herein may be enabled using any number of combinations of hardware, firmware, and/or as data and/or instructions embodied in various machine-readable or computer-readable media, in terms of their behavioral, register transfer, logic component, and/or other characteristics. Computer-readable media in which such formatted data and/or instructions may be embodied include, but are not limited to, non-volatile storage media in various forms (e.g., optical, magnetic or semiconductor storage media) and carrier waves that may be used to transfer such formatted data and/or instructions through wireless, optical, or wired signaling media or any combination thereof. Examples of transfers of such formatted data and/or instructions by carrier waves include, but are not limited to, transfers (uploads, downloads, e-mail, etc.) over the Internet and/or other computer networks via one or more data transfer protocols (e.g., HTTP, FTP, SMTP, and so on).

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to". Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

Although certain presently preferred implementations of the invention have been specifically described herein, it will be apparent to those skilled in the art to which the invention pertains that variations and modifications of the various implementations shown and described herein may be made without departing from the spirit and scope of the invention. Accordingly, it is intended that the invention be limited only to the extent required by the applicable rules of law.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

We claim:

1. A system for establishing secure wireless communications, comprising,
a credential-provisioning server, with a processor and a memory, in communication with an access point, a database, an access control server, and a network, the credential-provisioning server configured to,
receive from a mobile user equipment, via the access point, a request to access the network;
send, to the mobile user equipment, via the access point, a web page sign-in option of a third-party credential;
receive, from the mobile user equipment, via the access point, an indication to use the third-party credential;
redirect the mobile user equipment to a corresponding third-party website login page via the network, and include an identifier;
receive an authorization from the mobile user equipment via the access point, the authorization having been sent to the mobile user equipment from the third-party website after providing valid third-party credential to the third-party website;
generate a proxy-credential;
bind the authorization to the proxy-credential in the database;
send the proxy-credential to the mobile user equipment via the access point; and
authorize, via the access control server and the access point, the mobile user equipment to establish a secure connection;
exchange the authorization from a mobile user device for an access token from the third-party website via the network; and
send the access control server the access token to bind, in the database, to the proxy credential that corresponds to the mobile user equipment;
wherein the access control server is configured to,
subsequent to the mobile user equipment previously accessing the network,
receive the proxy-credential from the mobile user equipment via the access point, the proxy-credential having previously been sent to the mobile user equipment after successfully logging into the third-party website;
validate the proxy-credential from the mobile user equipment via the access point;
retrieve the access token bound to the received proxy-credential;
send, via the network, the access token to the third-party website for validation;
receive, via the network, an updated access token from the social network website if the access token is valid; and authorize the mobile user equipment to establish a secure connection via the access point.

2. The system of claim 1 wherein the credential-provisioning server is further configured to,
request, via the network,
permission to access user information from the third-party website; and
permission to update the third-party website with a location information of the mobile user equipment.

3. The system of claim 2 wherein the credential-provisioning server is further configured to,
request, via the network, the user information from the third-party website after receiving the authorization from the mobile user equipment; and
receive and save the user information from the third-party website in response to the request.

4. The system of claim 2 wherein the credential-provisioning server is further configured to,
send the location information of the mobile user equipment to the third-party website via the network.

5. The system of claim 1 wherein the proxy-credential is a username and password credential.

6. The system of claim 1 wherein the proxy-credential is a client-certificate credential.

7. The system of claim 1 wherein the proxy-credential is a dynamic pre-shared key.

8. The system of claim 1 wherein the third-party credential is a social network credential and the third-party website is a social network website.

9. The system of claim 1 wherein the identifier is an App-ID.

10. The system of claim 1 wherein the authorization is an authentication code.

11. The system of claim 1, wherein the, receive an authorization, and exchange the authorization for an access token, is via OAuthv2 (RFC-6749) protocol.

12. A method for establishing secure wireless communications, comprising,
via a credential-provisioning server in communication with an access point, a database, an access control server, and a network,
receiving from a mobile user equipment, via the access point, a request to access the network;
sending, to the mobile user equipment, via the access point, a web page sign-in option of a third-party credential;
receiving, from the mobile user equipment, via the access point, an indication to use the third-party credential;
redirecting the mobile user equipment to a corresponding third-party website login page via the network, and include a App-ID;
receiving an authorization from the mobile user equipment via the access point, the authorization having been sent to the mobile user equipment from the third-party website after providing valid third-party credential to the third-party website;
generating a proxy-credential;
binding the authorization to the proxy-credential in the database;
sending the proxy-credential to the mobile user equipment via the access point; and
authorizing, via the access control server and the access point, the mobile user equipment to establish a secure connection;
exchanging the authorization from the mobile user device for an access token from the third-party website via the network; and
sending the access control server the access token to bind, in the database, to the proxy credential that corresponds to the mobile user equipment;
via the access control server,
subsequent to the mobile user equipment previously accessing the network,
receiving the proxy-credential from the mobile user equipment via the access point, the proxy-credential having previously been sent to the mobile user equipment after successfully logging into the third-party website;
validating the proxy-credential from the mobile user equipment via the access point;
retrieving the access token bound to the received proxy-credential;
sending, via the network, the access token to the third-party website for validation;
receiving, via the network, an updated access token from the social network website if the access token is valid; and
authorizing the mobile user equipment to establish a secure connection via the access point.

13. The method of claim 12 further comprising, via the credential-provisioning server,
requesting, via the network,
permission to access user information from the third-party site; and
permission to update the third-party site with a location information of the mobile user equipment.

14. The method of claim 13 further comprising, via the credential-provisioning server,
requesting, via the network, the user information from the third-party site after receiving the authorization from the mobile user equipment; and
receiving and save the user information from the third-party website in response to the request.

15. The method of claim 13 further comprising, via the credential-provisioning server,
sending the location information of the mobile user equipment to the third-party website via the network.

16. The method of claim 12 wherein the proxy-credential is a username and password credential.

17. The method of claim 12 wherein the proxy-credential is a client-certificate credential.

18. The method of claim 12 wherein the proxy-credential is a dynamic pre-shared key.

19. The method of claim 12 wherein the third-party credential is a social network credential and the third-party website is a social network website.

20. The method of claim 12 wherein the,
receive an authorization code, and exchange the authorization for an access token, is via OAuthv2 (RFC-6749) protocol.

21. The method of claim 12 wherein the authorization is an authentication code.

22. A method for establishing secure wireless communications, comprising,
via an access control server in communication with a credential-provisioning server, an access point, a database, and a network,
receiving a proxy-credential from a mobile user equipment via the access point, the proxy-credential having previously been sent to the mobile user equipment from the credential-provisioning server after successfully logging into a third-party website;

validating the proxy-credential from the mobile user equipment via the access point; and authorizing the mobile user equipment to establish a secure connection via the access point;

binding an access token with the received proxy-credential;

sending, via the network, the access token to a third-party website for validation; and receiving, via the network, an updated access token from the social network website if the access token is valid.

23. The method of claim 22 wherein the proxy-credential is a username and password credential.

24. The method of claim 22 wherein the proxy-credential is a client-certificate credential.

25. The method of claim 22 wherein the proxy-credential is a dynamic pre-shared key.

26. The method of claim 22 wherein the proxy-credential was generated by the credential-provisioning server in response to the credential-provisioning server, receiving an authorization from the mobile user equipment via the access point, the authorization having been sent to the mobile user equipment from the third-party website after providing a valid third-party credential to the third-party website.

27. The method of claim 22 wherein the proxy-credential was generated by the credential-provisioning server in response to the credential-provisioning server, exchanging the authorization from the mobile user device for an access token from the third-party website via the network.

* * * * *